(12) United States Patent
Takata et al.

(10) Patent No.: US 10,768,354 B2
(45) Date of Patent: Sep. 8, 2020

(54) DISPLAY DEVICE

(71) Applicant: Panasonic Intellectual Property Management Co., Ltd., Osaka (JP)

(72) Inventors: Kazumasa Takata, Osaka (JP); Wahei Agemizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/267,433

(22) Filed: Feb. 5, 2019

(65) Prior Publication Data

US 2019/0369318 A1    Dec. 5, 2019

(30) Foreign Application Priority Data

May 30, 2018    (JP) .................................. 2018-103811

(51) Int. Cl.
   *F21V 8/00*    (2006.01)
(52) U.S. Cl.
   CPC ........... *G02B 6/0025* (2013.01); *G02B 6/006* (2013.01); *G02B 6/0031* (2013.01); *G02B 6/0068* (2013.01); *G02B 6/0073* (2013.01)
(58) Field of Classification Search
   CPC .. G02B 6/0068; G02B 6/0036; G02B 6/0018; G02B 6/0055; G02B 6/0043; G02B 6/0045; G02B 6/0035; G02B 5/045

USPC ......................................................... 362/628
See application file for complete search history.

(56) References Cited

U.S. PATENT DOCUMENTS

| 2010/0128496 A1* | 5/2010 | Chang | ................. G02B 6/0015 362/628 |
| 2013/0051076 A1* | 2/2013 | Mizuno | ................. G02B 6/002 362/613 |
| 2018/0136386 A1 | 5/2018 | Takata et al. | |

FOREIGN PATENT DOCUMENTS

| JP | 2016-180823 | 10/2016 |
| JP | 2018-081213 | 5/2018 |

* cited by examiner

*Primary Examiner* — William J Carter
(74) *Attorney, Agent, or Firm* — McDermott Will & Emery LLP

(57) ABSTRACT

A display device includes light guide plate, a light source, and a concealing plate. The light guide plate propagates light incident from an incident end surface, reflects the light with a prism provided on a reflection surface, and causes the light to emit from an emission surface facing the reflection surface. The light guide plate has a plurality of inclined surfaces on a side end surface excluding an incident end surface of the light guide plate and a facing end surface facing the incident end surface, and a line segment connecting a center of sides of the plurality of inclined surfaces and a center of the light source, and the sides of the inclined surfaces are substantially perpendicular.

9 Claims, 14 Drawing Sheets

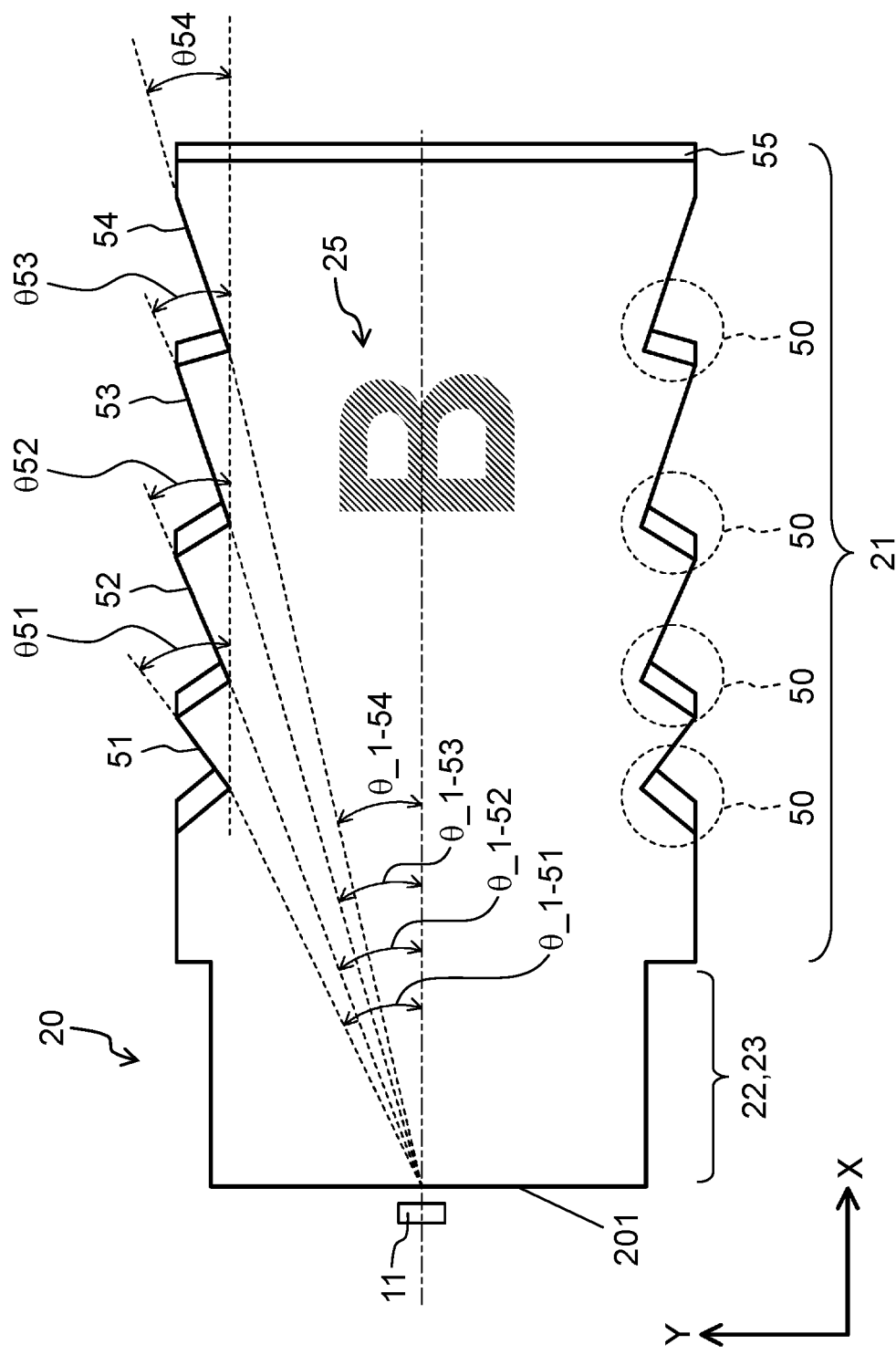

Prior Art

DISPLAY DEVICE

BACKGROUND

1. Technical Field

The present disclosure relates to a display device that displays information such as characters, figures, and pictures in an electronic apparatus or the like.

2. Description of the Related Art

In the related art, as this type of the display device, for example, as disclosed in Japanese Patent Unexamined Publication No. 2016-180823, there is known a display device including a transparent light guide plate and a light source such as a light emitting diode (LED) for allowing light to be incident on an end surface of the light guide plate.

The light incident on the end surface of the light guide plate is propagated inside the light guide plate and is reflected by a prism formed on a reflection surface of the light guide plate, so that the light is emitted from an emission surface facing the reflection surface. Therefore, the prism is provided in an appropriate shape and position, and the light source is caused to emit the light, so that information such as characters, figures, and pictures can be displayed.

Incidentally, a concealing plate may be used to conceal the light source. The concealing plate includes a light transmitter that transmits the light for displaying the information and a light shielding portion having a light transmittance lower than a light transmittance of the light transmitter, and the light source is concealed by the light shielding portion.

SUMMARY

According to an exemplary embodiment of the present disclosure, there is provided a display device including a light guide plate, a light source, and a concealing plate.

The light guide plate has an incident end surface, a reflection surface, and an emission surface.

The light guide plate propagates light incident from the incident end surface, reflects the light with a prism provided on the reflection surface, and causes the light to emit from the emission surface facing the reflection surface.

The light source causes the light to be incident on the incident end surface of the light guide plate.

The concealing plate includes a light transmitter and a light shielding portion.

The light transmitter is disposed on a side of the emission surface of the light guide plate and transmits the light emitted from the emission surface of the light guide plate.

The light shielding portion has a light transmittance lower than a light transmittance of the light transmitter.

The light guide plate has a plurality of inclined surfaces on a side end surface excluding the incident end surface of the light guide plate and a facing end surface facing the incident end surface, and a line segment connecting a center of sides of the plurality of inclined surfaces and a center of the light source, and the sides of the inclined surfaces are substantially perpendicular.

BRIEF DESCRIPTION OF THE DRAWINGS

FIG. 8 is a view illustrating a configuration in which the light guide plate is developed in a plane;

DETAILED DESCRIPTIONS

Prior to the description of a display device of the disclosure, a problem of the related art will be described. In a case where a concealing plate is provided in the display device described in Japanese Patent Unexamined Publication No. 2016-180823, the light reflected by a side surface of the light guide plate is reflected on the prism, is emitted from the emission surface of the light guide plate, and is incident on the light transmitter, so that a display contour such as characters and figures becomes unclear and may appear blurry. The problem will be described with reference to FIGS. 16 and 17.

Figure 16:
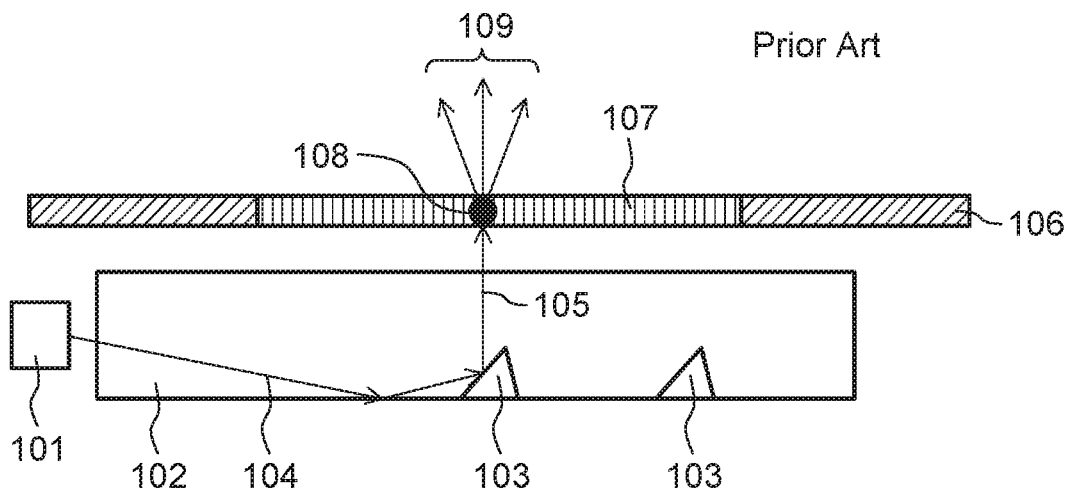
FIG. 16 is a view of a schematic configuration of a display device of the related art.

In FIG. 16, reference numeral 101 is a light source such as an LED, reference numeral 102 is a light guide plate, and reference numeral 103 is a prism disposed on a surface facing an emission surface of light guide plate 102. Reference numeral 106 is a concealing sheet having light scattering and transmitting properties and is disposed on a side of the emission surface of light guide plate 102. Portion 107 of concealing sheet 106 is a light scattering and transmitting portion having the light scattering and transmitting properties and portions except for light scattering and transmitting portion 107 are configured to substantially shield the light.

Light 104 emitted from light source 101 is guided to an inside of light guide plate 102. Light 104 is reflected by prism 103 and is emitted to the side of the emission surface of light guide plate 102. Emitted light 105 emitted from light guide plate 102 is incident on concealing sheet 106. This point is referred to as incident point 108. The light incident on incident point 108 is scattered and transmitted by a light scattering property of light scattering and transmitting portion 107 and generates transmitted and scattered light 109. Therefore, as viewed from a concealing sheet 106 side, incident point 108 appears to shine.

Figure 17:
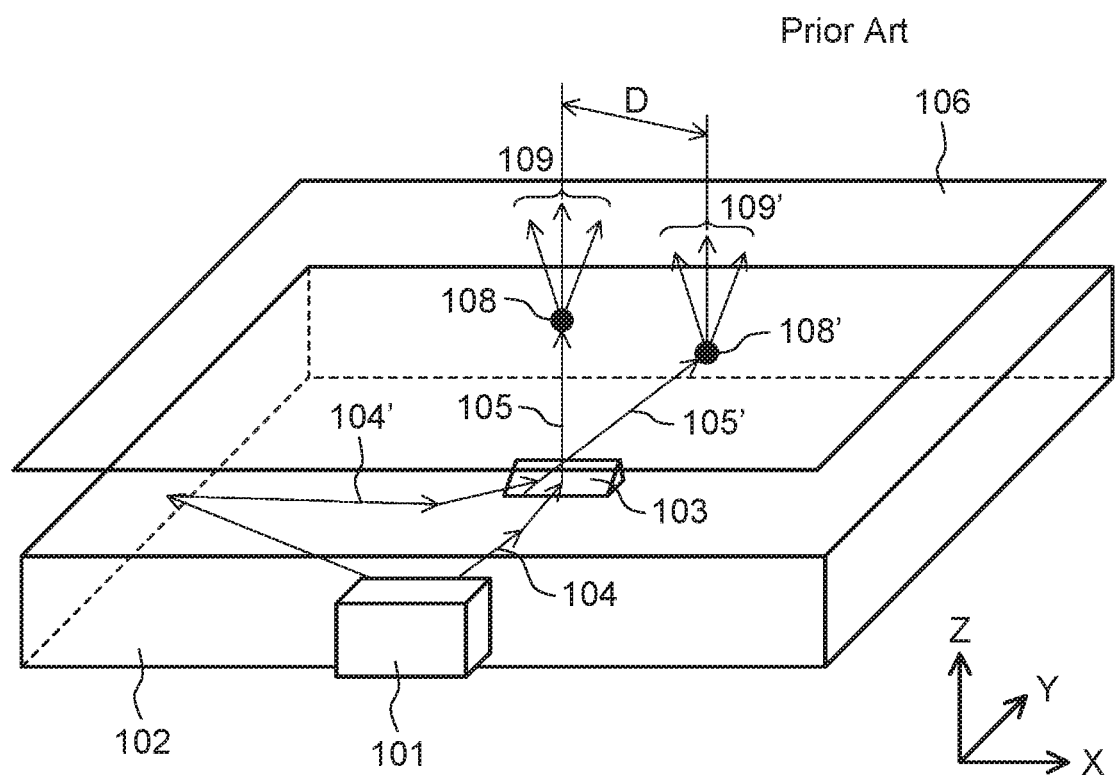
FIG. 17 is a perspective view for explaining a principle that a display contour becomes unclear in the display device of the related art.

FIG. 17 is a schematic view of a shape of light guiding of the light illustrated in FIG. 16 as viewed obliquely from above. Light 104 emitted from light source 101 is guided to the inside of light guide plate 102. Light 104 traveling toward prism 103 is reflected by prism 103 and becomes emitted light 105 emitted from light guide plate 102. Emitted light 105 is incident on incident point 108 of concealing sheet 106 and generates transmitted and scattered light 109. On the other hand, there is light 104' that does not travel toward prism 103 from light source 101.

Light 104' is reflected by the side surface of light guide plate 102 or the like, and is incident on prism 103 from an oblique direction. Therefore, light 104' is reflected from prism 103 in the oblique direction, is emitted from the emission surface of light guide plate 102, and becomes emitted light 105'.

Since emitted light 105' is emitted from prism 103 in the oblique direction, a position where the light is incident on concealing sheet 106 is incident point 108' different from incident point 108. The light incident on incident point 108' generates transmitted and scattered light 109'.

Therefore, when viewed from concealing sheet 106 side, transmitted and scattered light 109' is viewed together with transmitted and scattered light 109, and incident point 108' which is separated by distance D also appears to shine together with incident point 108.

That is, the light reflected by one prism 103 indicates that the light illuminates a plurality of portions of light scattering and transmitting portion 107 and an outline of the picture displayed as an assembly of prisms 103 is blurred.

The disclosure has been made in view of the above points, and an object thereof is to provide a display device that suppresses unclear display contours of characters, figures, and the like.

Hereinafter, exemplary embodiments of the disclosure will be described with reference to the drawings. The following description of preferred exemplary embodiments is merely exemplary in nature and is not intended to limit the disclosure, an application, or a usage thereof.

Exemplary Embodiment 1

Figure 1:
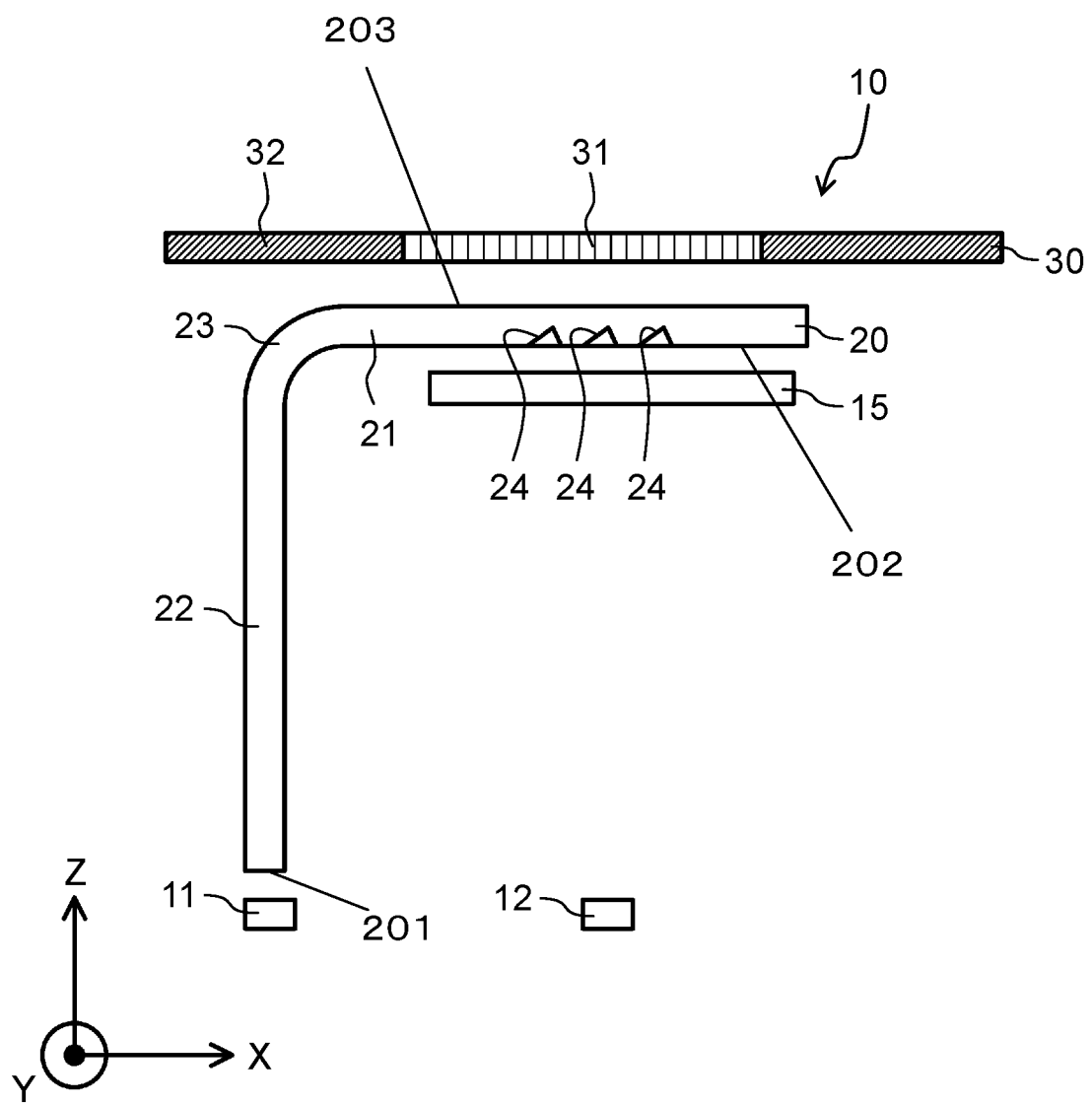
FIG. 1 is a view of a schematic configuration of a display device according to Embodiment 1.

FIG. 1 is a view of a schematic configuration of a display device according to Embodiment 1. In the drawing, directions of XYZ are illustrated. Here, a Z direction is a direction in which light propagating inside a light guide plate is reflected by a prism and the light reflected by the prism is emitted. Two directions perpendicular to the Z direction and orthogonal to each other are respectively an X direction and a Y direction. As illustrated in FIG. 1, display device 10 includes first light source 11, second light source 12, design sheet 15, light guide plate 20, and concealing sheet 30 (concealing plate).

Figure 2:
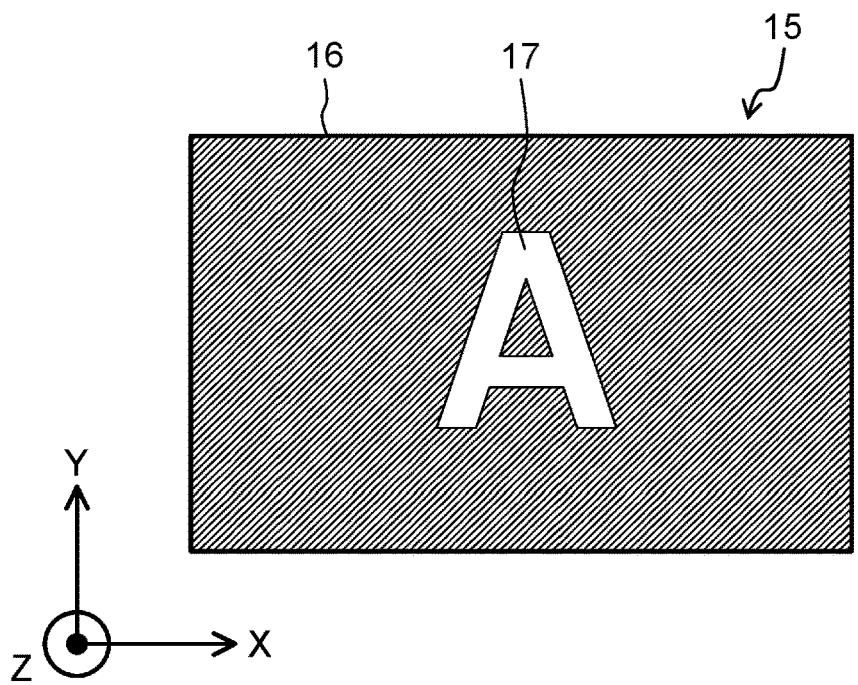
FIG. 2 is a view illustrating a configuration of a design sheet.

Design sheet 15 is disposed on a side of a reflection surface of display unit 21 of light guide plate 20. As illustrated in FIG. 2, design sheet 15 has light shielding portion 16 that does not transmit light and light transmitting portion 17 that is formed in a shape of a character or a picture and transmits the light. In an example illustrated in FIG. 2, light transmitting portion 17 is formed in a shape of character "A".

Figure 3:
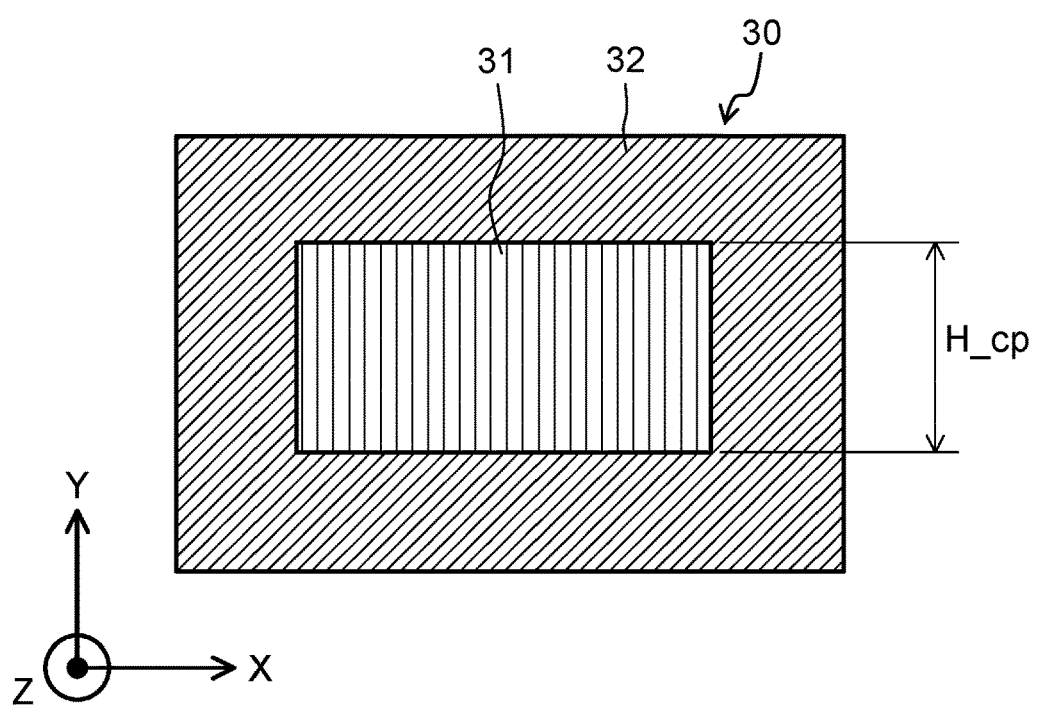
FIG. 3 is a view illustrating a configuration of a concealing sheet.

As illustrated in FIG. 1, concealing sheet 30 is disposed on a side of the emission surface of display unit 21 of light guide plate 20. As illustrated in FIG. 3, concealing sheet 30 has light transmitter 31 having a scattering property for transmitting light for information display and light shielding portion 32 having a light transmittance lower than that of light transmitter 31. Here, a height of light transmitter 31 in the Y direction is H_cp.

As illustrated in FIG. 1, first light source 11 and second light source 12 are configured by LEDs or the like. The light from first light source 11 is incident on light incident portion 22 of light guide plate 20 and is guided into light guide plate 20. The light from second light source 12 transmits light transmitting portion 17 of design sheet 15 and display unit 21 of light guide plate 20, and is displayed on light transmitter 31 of concealing sheet 30.

Figure 4:
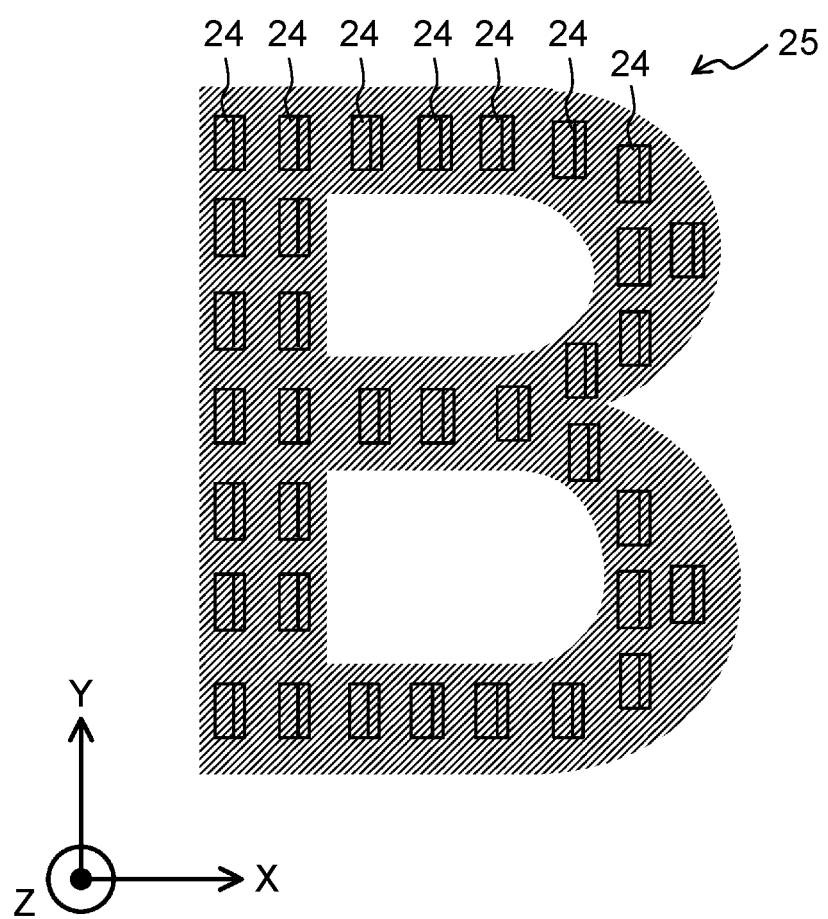
FIG. 4 is a view illustrating a picture as an assembly of prisms.

Light guide plate 20 has display unit 21 extending in the X direction, light incident portion 22 extending in the Z direction, and bent portion 23 continuously connecting display unit 21 and light incident portion 22. Furthermore, light guide plate 20 has incident end surface 201, reflection surface 202, and emission surface 203. A part of reflection surface 202 is display unit 21 and a plurality of prisms 24 are provided in display unit 21. As illustrated in FIG. 4, picture 25 is formed as an assembly of fine prisms 24. In the example illustrated in FIG. 4, picture 25 is character "B".

Figure 5:
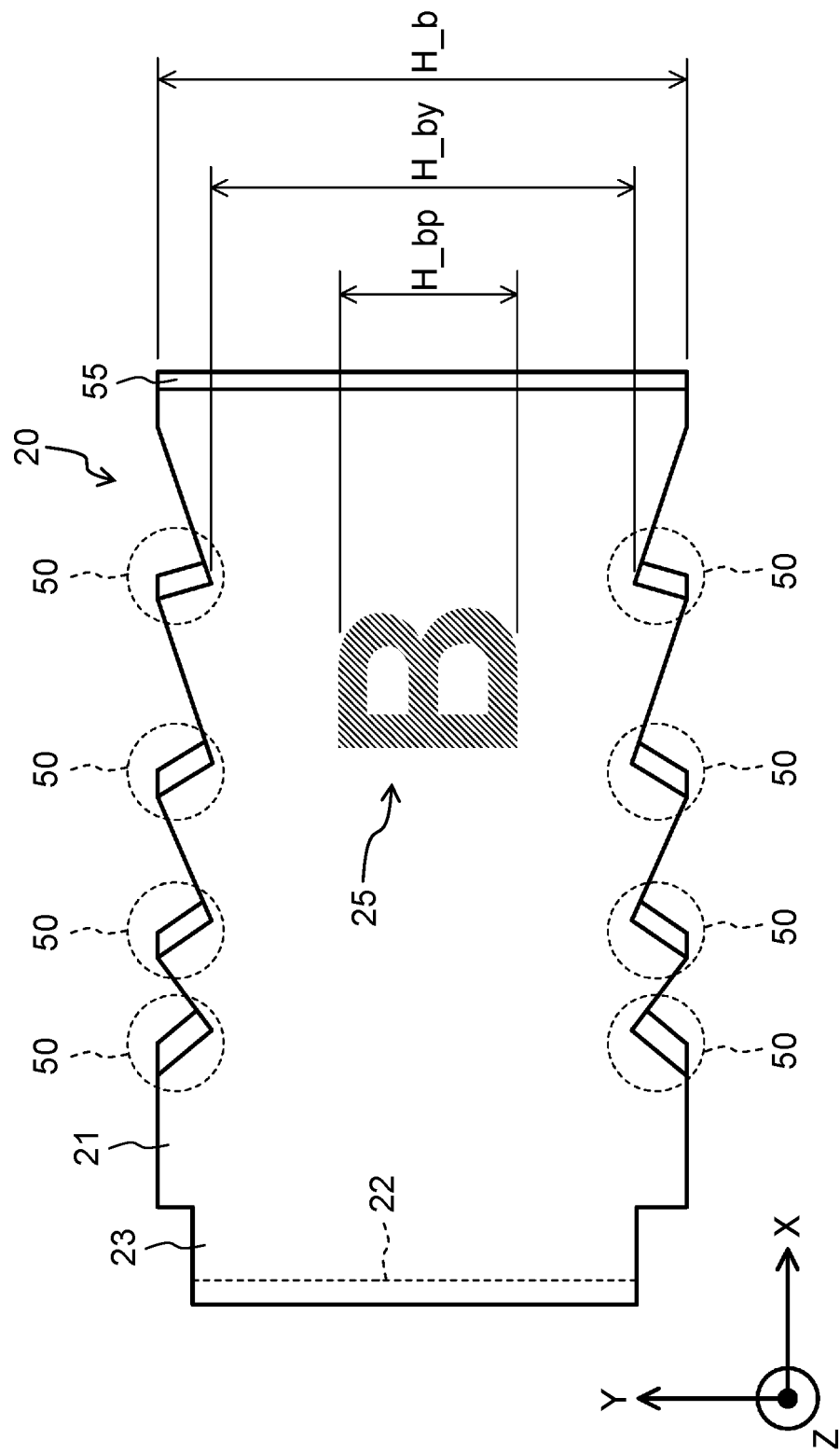
FIG. 5 is a view illustrating a configuration of a light guide plate.

FIG. 5 is a view illustrating a configuration of light guide plate 20 as viewed from a concealing sheet 30 side. As illustrated in FIG. 5, display unit 21 of light guide plate 20 is provided with a plurality of triangular portions 50 as an inclined surface group, and inclined surface cut portion 55. Triangular portions 50 are formed on a first side and a second side (both sides in the Y direction in FIG. 5) which are parallel to a center line of the light to be guided and substantially perpendicular to the emission surface in display unit 21.

Figure 6A:
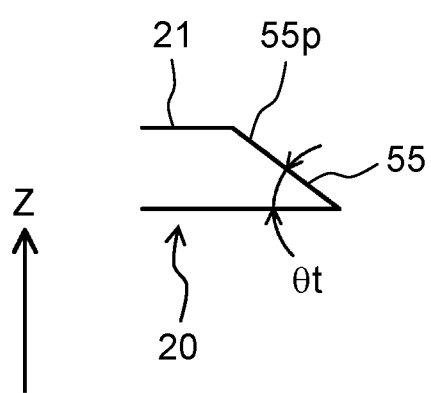
FIG. 6A is a view illustrating a shape of an inclined surface of a triangular portion.

Inclined surface cut portion 55 is formed on a side surface (side surface on a right side in the X direction in FIG. 5) on a side opposite to a portion on which the light from first light source 11 is incident in display unit 21. Also as illustrated in FIG. 6A, inclined surface cut portion 55 is formed in a shape in which a lower surface is longer than an upper surface of light guide plate 20. Here, an angle formed by inclined surface cut portion 55 and a bottom surface of light guide plate 20 is θt.

Figure 6B:
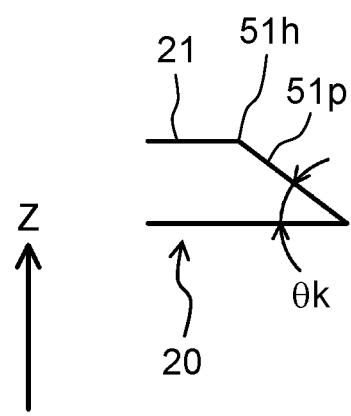
FIG. 6B is a view illustrating a shape of an inclined surface cut portion of the triangular portion.

As will be described in detail later, as illustrated in FIG. 6B, the plurality of triangular portions 50 are also formed of a plurality of cut surfaces 51p having the same cross-sectional shape as that of inclined surface cut portion 55. Here, an angle formed by cut surface 51p and the bottom surface of light guide plate 20 is θk. Furthermore, the bottom surface of light guide plate 20 and reflection surface 202 are the same surface.

Figure 7A:
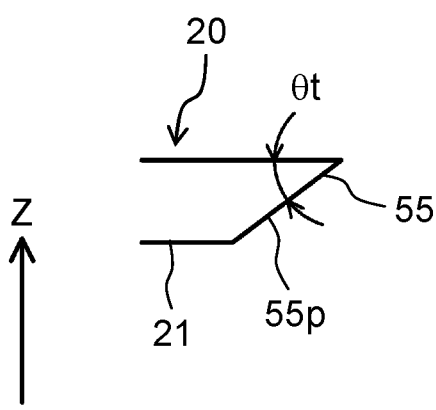
FIG. 7A is a view illustrating another shape of the inclined surface of the triangular portion.
Figure 7B:
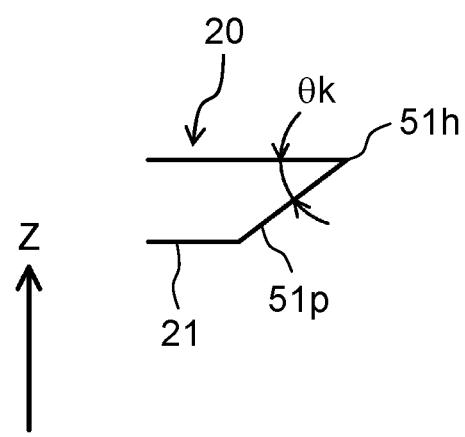
FIG. 7B is a view illustrating another shape of the inclined surface cut portion of the triangular portion.

A shape of inclined surface cut portion 55 is not limited thereto and, for example, as illustrated in FIG. 7A, inclined surface cut portion 55 may be formed of a shape in which the lower surface is shorter than the upper surface of light guide plate 20. Also, cut surfaces 51p of the plurality of triangular portions 50, as illustrated in FIG. 7B, may have a cross-sectional shape which is formed in a shape in which the lower surface is shorter than the upper surface of light guide plate 20.

Figure 9:
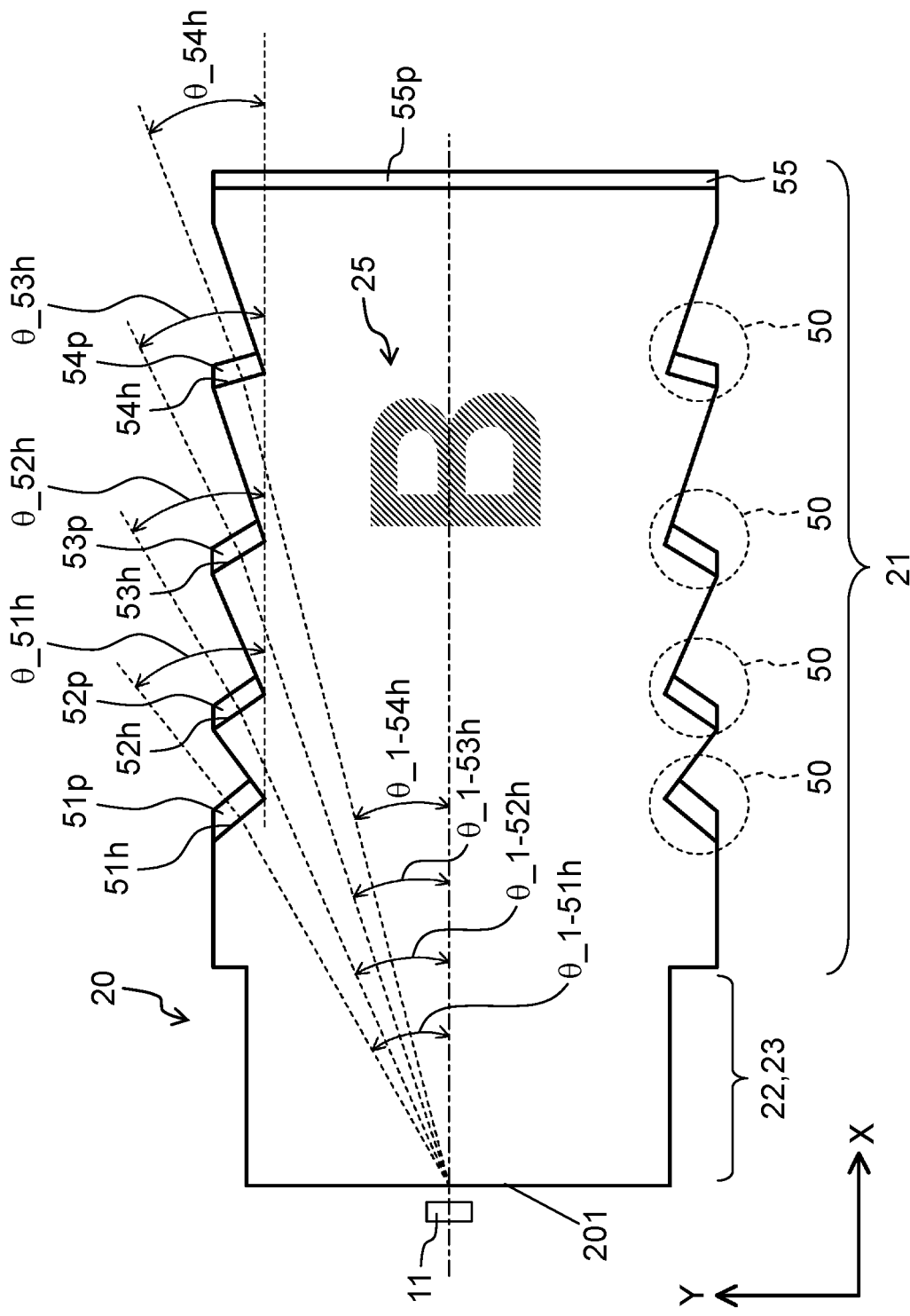
FIG. 9 is a view illustrating a configuration in which the light guide plate is developed in a plane.

FIGS. 8 and 9 are views illustrating a state where display unit 21, bent portion 23, and light incident portion 22 are developed in a plane by extending bent portion 23 of light guide plate 20. Here, in a state where display unit 21, bent portion 23, and light incident portion 22 are developed in a plane, a center position of light source 11 disposed in incident end surface 201 is defined as a virtual light source. As illustrated in FIGS. 8 and 9, triangular portions 50 are formed at four positions on the upper side and four positions on the lower side of display unit 21. In the following description, four triangular portions 50 on the upper side will be described.

As illustrated in FIGS. 8 and 9, four triangular portions 50 have first inclined surface sides 51, 52, 53, and 54 and second inclined surface sides 51h, 52h, 53h, and 54h. As illustrated in FIG. 8, first inclined surface sides 51 to 54 are sides inclined so as to spread outward in the Y direction as going in a reverse light guiding direction (left direction in FIG. 8).

Here, angles formed by a line segment connecting a center of first light source 11 and a center of picture 25 and line segments connecting the center of first light source 11 and each center of four first inclined surface sides 51 to 54 are respectively θ_1-51, θ_1-52, θ_1-53, and θ_1-54.

In addition, angles formed by the line segment connecting the center of first light source 11 and the center of picture 25 and each of four first inclined surface sides 51 to 54 are respectively θ51, θ52, θ53, and θ54.

As illustrated in FIG. 9, second inclined surface sides 51h to 54h are other sides of sides forming triangular portions 50, which are different from first inclined surface sides 51 to 54. Cut surfaces 51p, 52p, 53p, and 54p are formed so as to incline from second inclined surface sides 51h, 52h, 53h, and 54h toward a deep side in the drawing.

Cut surfaces 51p to 54p are formed, for example, in a cross-sectional shape which is formed in a shape in which the lower surface is longer than the upper surface of light guide plate 20 illustrated in FIG. 6B. Cut surfaces 51p to 54p may be formed in a cross-sectional shape which is formed in a shape in which the upper surface is shorter than the lower surface of light guide plate 20 illustrated in FIG. 7B.

Here, angles formed by the line segment connecting the center of first light source 11 and the center of picture 25 and line segments connecting the center of first light source 11 and each center of four second inclined surface sides 51h to 54h are respectively θ_1-51h, θ_1-52h, θ_1-53h, and θ_1-54h. In addition, angles formed by the line segment connecting the center of first light source 11 and the center of picture 25 and each perpendicular line of second inclined surface sides 51h to 54h are respectively θ_51h, θ_52h, θ_53h, and θ_54h. The line segments connecting the centers of second inclined surface sides 51h to 54h and the center of the first light source and second inclined surface sides 51h to 54h are substantially perpendicular to each other.

Inclined surface cut portion 55 has cut surface 55p. Cut surface 55p is an inclined surface formed on the side surface facing a light incident side, which is perpendicular to the center line of the light to be guided and perpendicular to the emission surface.

As illustrated in FIG. 5, a height of picture 25 to be displayed is H_bp, a height of display unit 21 of light guide plate 20 is H_b, and a height (distance between vertexes of triangular portions 50 on the upper side and the lower side) of a portion without triangular portion 50 in display unit 21 is H_by.

Figure 10A:
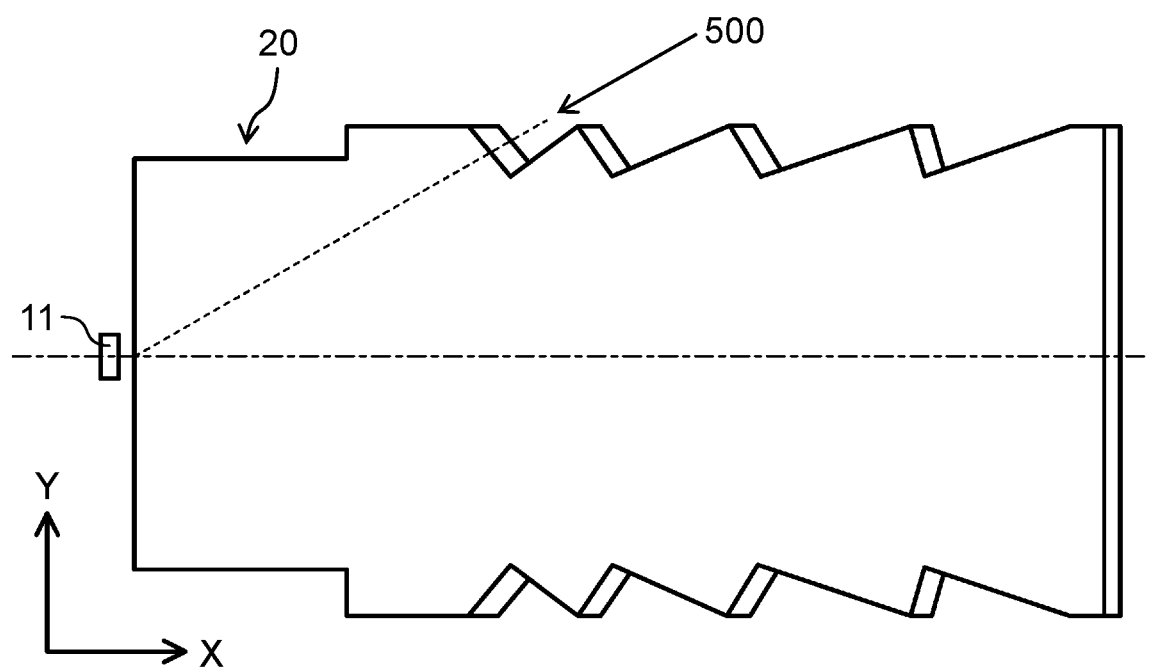
FIG. 10A is a plan view illustrating a shape of light guide of light in the light guide plate.
Figure 10B:
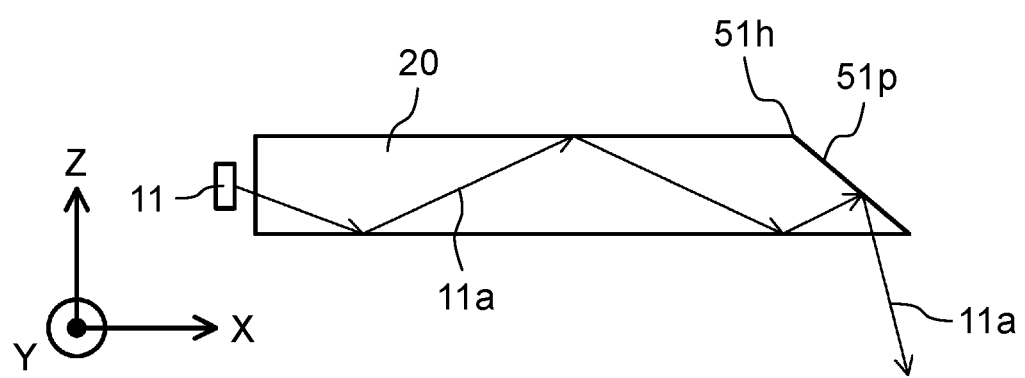
FIG. 10B is a side view illustrating a shape of the light guide of the light in the light guide plate.

FIGS. 10A and 10B are schematic views for explaining an operation of triangular portion 50 of light guide plate 20. FIG. 10B illustrates a shape of light guide of light in a cross section of light guide plate 20 in a direction of arrow 500 illustrated in FIG. 10A.

Light 11a emitted from first light source 11 propagates light incident portion 22, bent portion 23, and display unit 21 of light guide plate 20, and is incident on cut surface 51p. The light incident on cut surface 51p is reflected by cut surface 51p and is emitted from light guide plate 20.

Although only one cut surface 51p is described, in the same manner, the light arriving at other cut surfaces 52p to 54p is also reflected to the outside of light guide plate 20.

Therefore, the light reflected by the end surface can be suppressed to be propagated to light guide plate 20 again. In order to obtain this effect, it is necessary that cut surfaces 51p to 54p and first inclined surface sides 51 to 54 are in a predetermined direction.

Specifically, the following conditions have to be satisfied.

$$|(\theta\_1\text{-}51)-(\theta 51)|\leq 40° \quad (1)$$

$$|(\theta\_1\text{-}52)-(\theta 52)|\leq 40° \quad (2)$$

$$|(\theta\_1\text{-}53)-(\theta 53)|\leq 40° \quad (3)$$

$$|(\theta\_1\text{-}54)-(\theta 54)|\leq 40° \quad (4), \text{and}$$

$$|(\theta\_1\text{-}51h)-(\theta\_51h)|\leq 40° \quad (5)$$

$$|(\theta\_1\text{-}52h)-(\theta\_52h)|\leq 40° \quad (6)$$

$$|(\theta\_1\text{-}53h)-(\theta\_53h)|\leq 40° \quad (7)$$

$$|(\theta\_1\text{-}54h)-(\theta\_54h)|\leq 40° \quad (8), \text{and}$$

$$20°<\theta k<60° \quad (9) \text{ and}$$

$$20°<\theta t<60° \quad (10)$$

Here, in the angles of first inclined surface sides 51 to 54, for example, when $|(\theta\_1\text{-}51)-(\theta 51)|$ exceeds 40°, the light from first light source 11 is reflected by first inclined surface side 51 and unnecessary reflected light propagates inside light guide plate 20. Therefore, it is necessary to satisfy the expressions (1) to (4) described above.

In the angles of cut surfaces 51p to 54p, when $|(\theta\_1\text{-}51h)-(\theta\_51h)|$ exceeds 40°, the light from first light source 11 is reflected by first inclined surface side 51 and is obliquely incident on first inclined surface side 51, the reflected light does not travel in the direction of emitting from light guide plate 20, and propagates light guide plate 20 again. Therefore, it is necessary to satisfy the expressions (5) to (8) described above. That is, when the expressions (5) to (8) described above are satisfied, the line segments connecting the center of second inclined surface sides 51h to 54h and the center of the first light source, and second inclined surface sides 51h to 54h are in a substantially perpendicular relationship.

Here, when angle θp(n) is formed by a line segment obtained by projecting the line segment connecting a center of each side in each emission surface constituting the inclined surface group and a position where the light from the light source is incident on the light guide plate and is regarded as the virtual light source in the light guide plate, on the emission surface, and a perpendicular line of each side in each emission surface constituting the inclined surface group, the expressions (5) to (8) described above can be expressed by the following expression.

$$|\theta p(n)| \leq 40° \ (n=1,2,\ldots)$$

Here, n is a natural number of 1 or more.

In addition, if the angle of inclined surface cut portion 55 or the inclined surface of triangular portion 50 is larger than 60°, the light reflected by the surface does not emit to the outside of light guide plate 20 and a propagation rate in light guide plate 20 increases again. Similarly, even if the angle thereof is smaller than 20°, the light reflected by the surface does not emit to the outside of light guide plate 20, the propagation rate in light guide plate 20 increases again, and a sufficient effect cannot be obtained. Therefore, it is necessary to satisfy the expressions (9) and (10) described above.

In addition, in order not to display an unnecessary picture on display information, it is desirable that the following condition is satisfied.

$$H\_b > H\_by > H\_cp > H\_bp \tag{11}$$

Specifically, if H_cp is larger than H_by, there is a possibility that the light emitted to the outside of light guide plate 20 by triangular portion 50 is viewed through light transmitter 31 of the light of concealing sheet 30. In addition, if H_bp is larger than H_cp, the reflected light by prism 24 forming picture 25 to be displayed is shielded by light shielding portion 32 of concealing sheet 30 and cannot be displayed. Therefore, it is necessary to satisfy the expression (11) described above.

As described above, according to display device 10 of the exemplary embodiment, since the light incident from first light source 11 is reflected by the side surface of light guide plate 20 and does not become unnecessary propagation light, a spread angle of the light incident on prism 24 can be narrowed. Therefore, an emission angle from light guide plate 20 can be reduced and display blur can be suppressed.

Exemplary Embodiment 2

Figure 11:
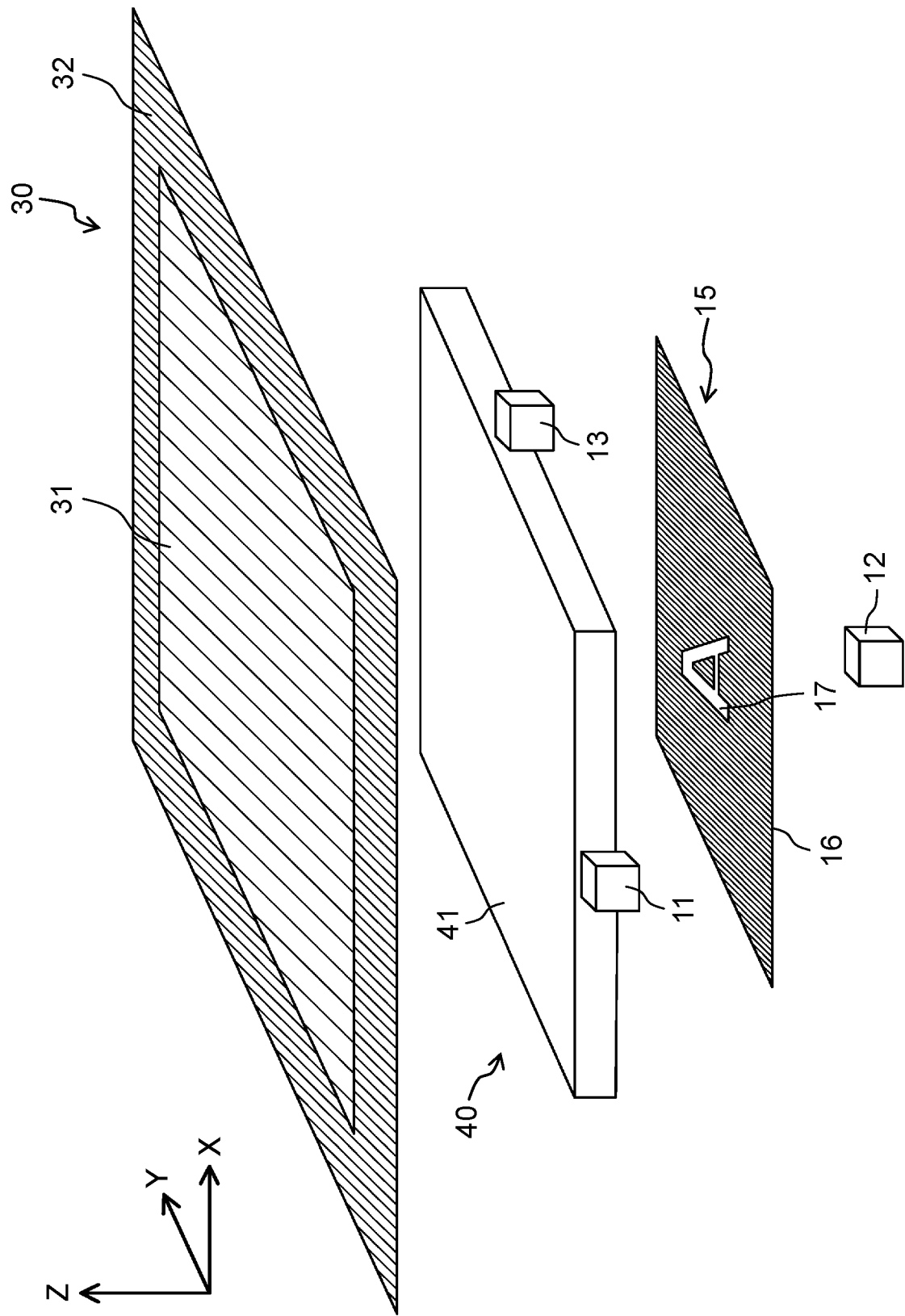
FIG. 11 is a perspective view illustrating a schematic configuration of a display device according to Embodiment 2.

FIG. 11 is a schematic view illustrating a configuration of a display device according to Embodiment 2. Hereinafter, the same reference numerals are given to the same portions as those of Embodiment 1 and only difference will be described.

As illustrated in FIG. 11, light guide plate 40 is constituted of one sheet material spreading in the X and Y directions, and has display unit 41.

First light sources 11 and 13 are respectively disposed at an end portion in the X direction and an end portion in the Y direction of display unit 41 of light guide plate 40. Light from first light sources 11 and 13 is incident from the end surface of light guide plate 40 and is guided into light guide plate 40. Light from second light source 12 transmits light transmitting portion 17 of design sheet 15 and display unit 41 of light guide plate 40, and is displayed on light transmitter 31 of concealing sheet 30.

Figure 12:
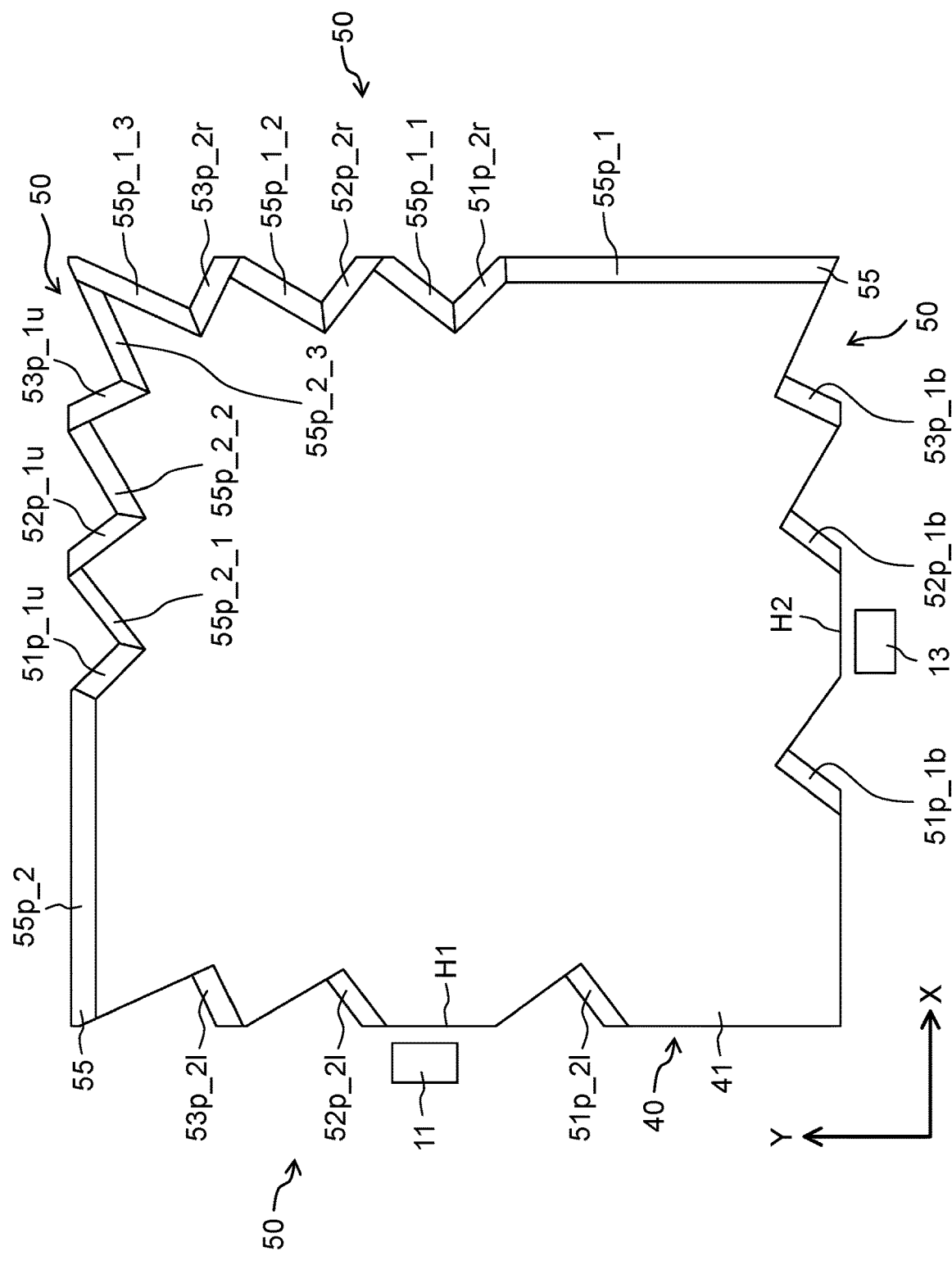
FIG. 12 is a view illustrating a configuration of a light guide plate.

As illustrated in FIG. 12, display unit 41 of light guide plate 40 is provided with light incident portions H1 and H2, a plurality of triangular portions 50, and inclined surface cut portion 55. Specifically, in light guide plate 40, light incident portion H1 is provided at a position facing first light source 11 disposed on a left side in FIG. 12. In addition, triangular portions 50 are formed on sides of an upper side and a lower side in FIG. 12 so as to correspond to the light from first light source 11. In addition, inclined surface cut portion 55 is formed on a side of a right side in FIG. 12.

In addition, in light guide plate 40, light incident portion H2 is provided at a position facing first light source 13 disposed on the lower side in FIG. 12. In addition, triangular portions 50 are formed on sides of the left side and the right side in FIG. 12 so as to correspond to the light from first light source 13. In addition, inclined surface cut portion 55 is formed on the side of the upper side in FIG. 12.

Figure 13A:
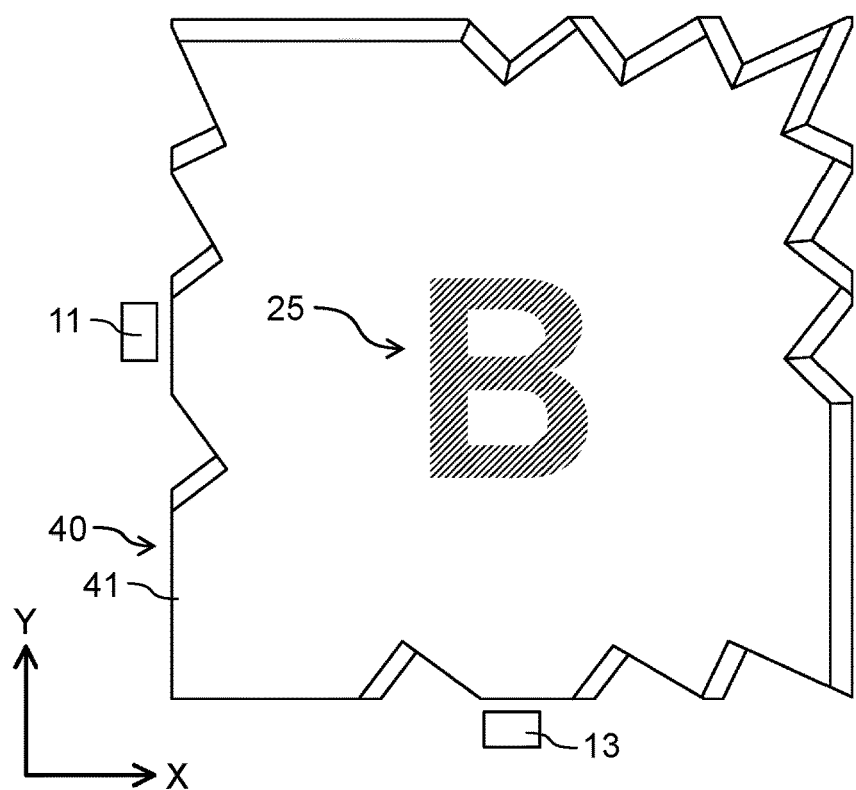
FIG. 13A is a view illustrating a picture displayed on the light guide plate by a light source on a left side.
Figure 13B:
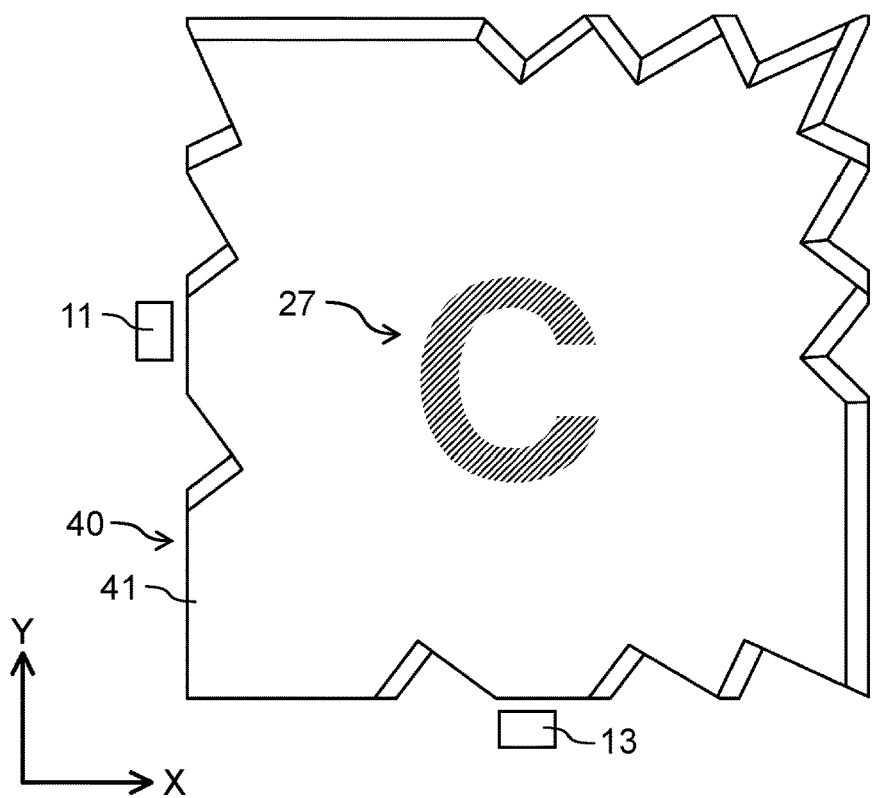
FIG. 13B is a view illustrating a picture displayed on the light guide plate by a light source on a lower side.

FIGS. 13A and 13B illustrate examples of pictures 25 and 27 to be displayed on light guide plate 40. As illustrated in FIG. 13A, picture 25 (character "B") is displayed on light guide plate 40 by the light from first light source 11 disposed on the left side. In addition, as illustrated in FIG. 13B, picture 27 (character "C") is displayed by the light from first light source 13 disposed on the lower side.

Figure 14A:
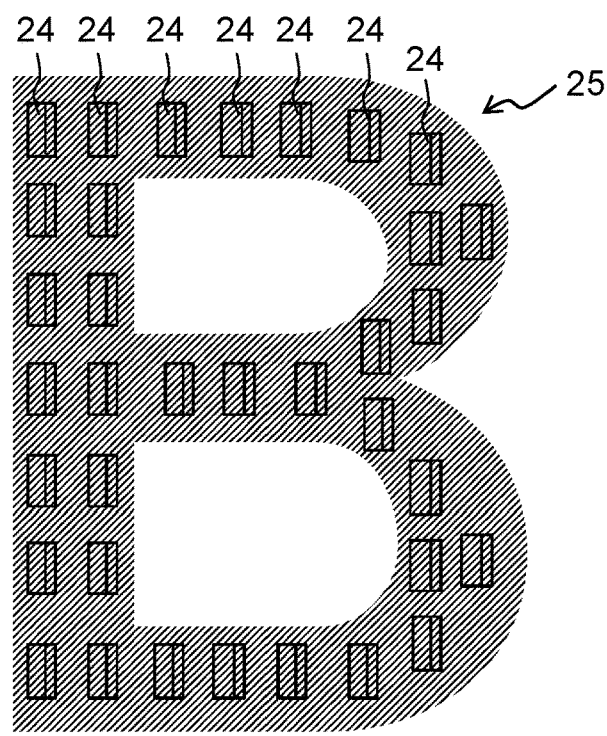
FIG. 14A is a view illustrating a picture in which the light of the light source on the left side is reflected by a prism to be displayed.

Specifically, as illustrated in FIG. 14A, picture 25 is formed by an assembly of prisms 24. Prisms 24 are disposed so as to reflect the light from first light source 11 disposed on the left side and emit the light toward a front of light guide plate 40.

Figure 14B:
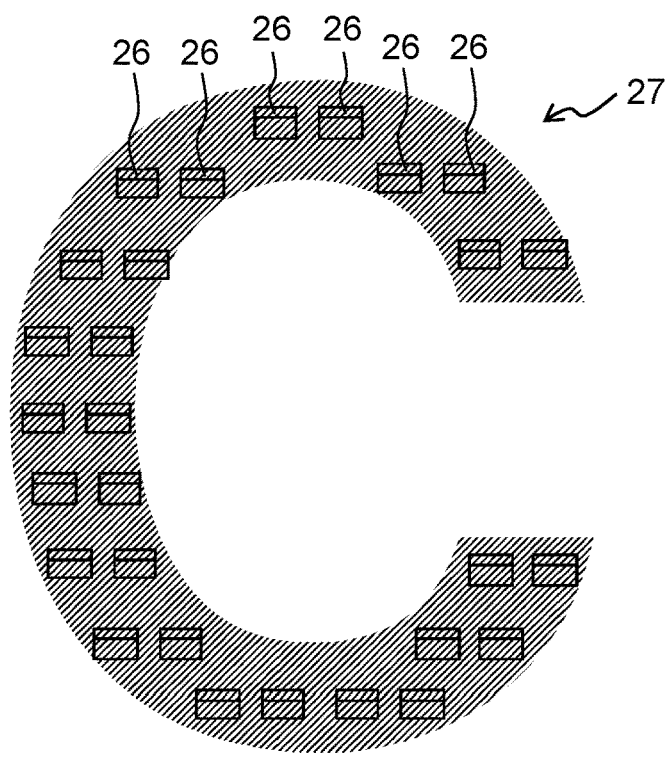
FIG. 14B is a view illustrating a picture in which the light of the light source on the lower side is reflected by a prism to be displayed.

As illustrated in FIG. 14B, picture 27 is formed by an assembly of prisms 26. Prisms 26 are disposed so as to reflect the light from first light source 13 disposed on the lower side and emit the light toward the front of light guide plate 40.

Therefore, first light sources 11 and 13 are turned on corresponding to pictures 25 and 27 to be displayed, so that it is possible to switch two pictures 25 and 27 to be displayed on light guide plate 40.

For first light source 11 disposed on the left side in FIG. 12, cut surfaces 51p, 52p, and 53p of FIG. 9 illustrated in Embodiment 1 correspond to cut surfaces 51p_1u, 52p_1u, and 53p_1u, and cut surfaces 51p_1b, 52p_1b, and 53p_1b of FIG. 12. In addition, cut surface 55p of FIG. 9 corresponds to cut surfaces 55p_1, 55p_1_1, and 55p_1_2, and 55p_1_3 of FIG. 12.

In addition, for first light source 13 disposed on the lower side in FIG. 12, considering the disposition of light guide plate 40 by rotating by 90°, cut surfaces 51p, 52p, and 53p of FIG. 9 correspond to cut surfaces 51p_2r, 52p_2r, and 53p_2r, and cut surfaces 51p_2l, 52p_2l, and 53p_2l of FIG. 12. In addition, cut surface 55p of FIG. 9 corresponds to cut surfaces 55p_2, 55p_2_1, and 55p_2_2, and 55p_2_3 of FIG. 12.

In light guide plate 40 having such a configuration, when first light source 11 disposed on the left side in FIG. 13A is turned on, similar to Embodiment 1, picture 25 of FIG. 13A is displayed. In this case, the reflection at the end surface of light guide plate 40 can be suppressed, so that an outline of the picture is not blurred.

Similarly, when first light source 13 disposed on the lower side in FIG. 13B is turned on, picture 27 of FIG. 13B is displayed. In this case, the reflection at the end surface of light guide plate 40 can be suppressed, so that the outline of the picture is not blurred.

Exemplary Embodiment 3

Figure 15:
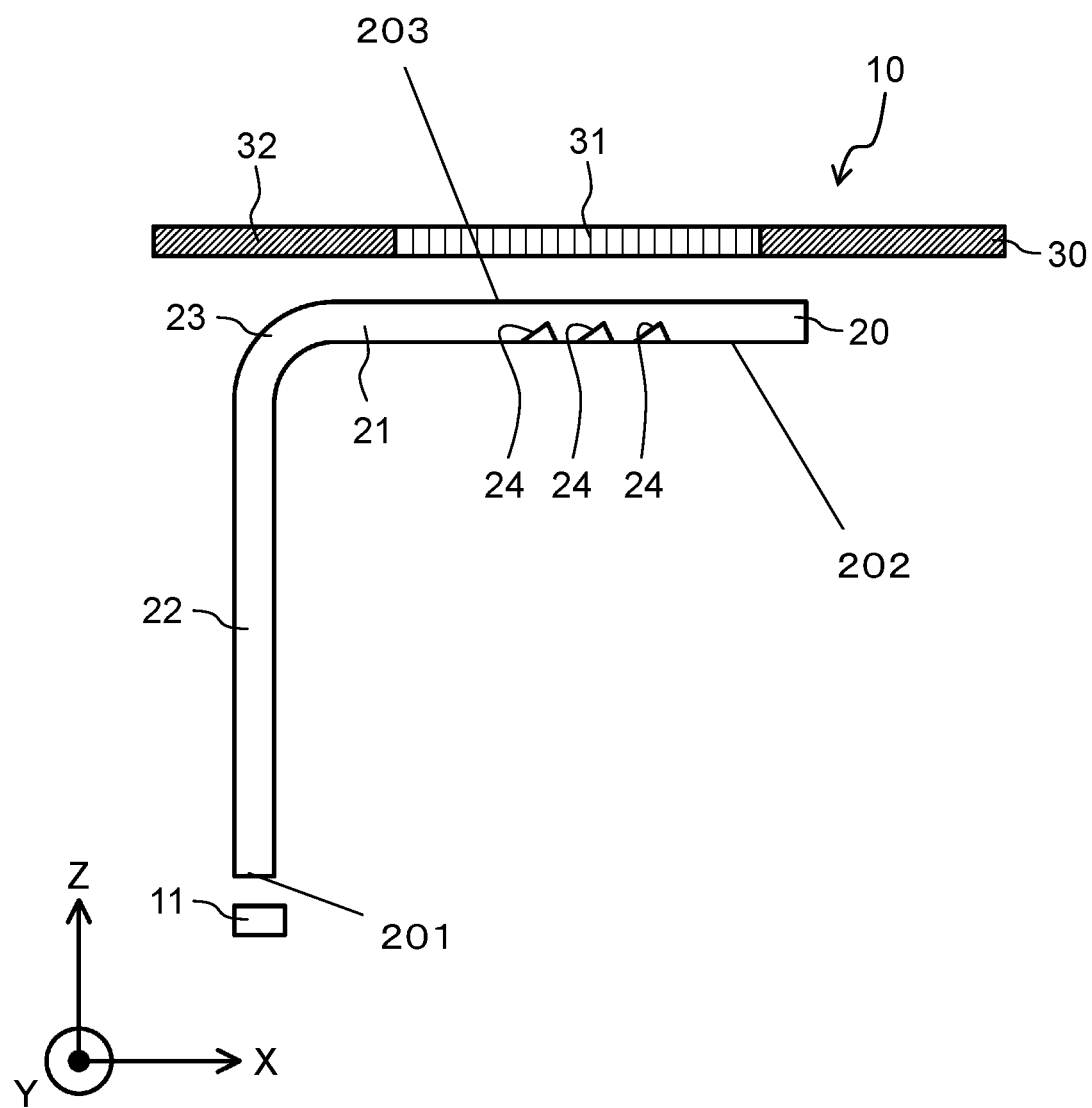
FIG. 15 is a view of a schematic configuration of a display device according to Embodiment 3.

FIG. 15 is a schematic view of a configuration of a display device according to Embodiment 3 of the disclosure. Hereinafter, the same reference numerals are given to the same portions as those of Embodiment 1 and only difference will be described.

As illustrated in FIG. 15, display device 10 includes first light source 11, light guide plate 20, and concealing sheet 30.

Light from first light source 11 is incident on light incident portion 22 of light guide plate 20 and is guided into light guide plate 20. A picture pattern is displayed by the assembly of prisms 24 provided in display unit 21 of light guide plate 20 by the same operation as that described in Embodiment 1. Light guide plate 20 further has incident end surface 201, reflection surface 202, and emission surface 203.

As described above, according to display device 10 of the exemplary embodiment, since the light incident from first light source 11 does not become unnecessary propagation light not being reflected by the side surface of light guide plate 20, a spread angle of the light incident on prism 24 can be narrowed. Therefore, an emission angle from light guide plate 20 can be reduced and display blur can be suppressed.

According to the display device of the disclosure, it is possible to eliminate unnecessary reflected light from the side surface of the light guide plate and reduce the spread angle of the light incident on the prism. Therefore, even if the concealing plate is provided on the side of the emission surface of the light guide plate, a display device with good appearance that unclear display contours of characters, figures, and the like are not blurred can be obtained.

The disclosure contributes to an improvement in the quality of a display device used for electrical device and apparatus such as home use, industrial use, in-vehicle use, or the like, or a display unit of a switch having an input function.

What is claimed is:

1. A display device comprising:
    a light guide plate that has an incident end surface, a reflection surface, and an emission surface, propagates light incident from the incident end surface, reflects the light with a prism provided on the reflection surface, and causes the light to emit from the emission surface facing the reflection surface;
    a light source that causes the light to be incident on the incident end surface of the light guide plate; and
    a concealing plate that includes:
        a light transmitter that is disposed on a side of the emission surface of the light guide plate and transmits the light emitted from the emission surface of the light guide plate, and
        a light shielding portion having a light transmittance lower than a light transmittance of the light transmitter,
    wherein the light guide plate has an inclined surface group formed by a plurality of inclined surfaces on a side end surface excluding the incident end surface of the light guide plate and a facing end surface facing the incident end surface,
    wherein a line segment connecting a center of sides of the plurality of inclined surfaces and a center of the light source, and the sides of the inclined surfaces are substantially perpendicular and
    wherein each of the sides of the plurality of inclined surfaces form a different angle with respect to a line segment extending through the center of the light guide plate.

2. The display device of claim 1,
    wherein the light source is one of a plurality of light sources,
    wherein the plurality of light sources are disposed so as to cause the light to be incident on each of a first incident end surface and a second incident end surface of the light guide plate, and
    wherein the light guide plate has a first inclined surface group and a second inclined surface group,
    the first inclined surface group including first inclined surfaces on one or more side end surfaces excluding the first incident end surface and a first facing end surface facing the first incident end surface from the plurality of side end surfaces of the light guide plate,
    the second inclined surface group including second inclined surfaces on one or more side end surfaces excluding the second incident end surface and a second facing end surface facing the second incident end surface from the plurality of side end surfaces of the light guide plate,
    the first inclined surfaces each have a side substantially perpendicular to a light receiving position of the first incident end surface, and
    the second inclined surfaces each have a side substantially perpendicular to a light receiving position of the second incident end surface.

3. The display device of claim 1, wherein an angle $\theta k$ formed by each of the inclined surfaces of the inclined surface group and the reflection surface in the light guide plate satisfies a condition of $20°<\theta<60°$.

4. The display device of claim 3, wherein an angle $\theta p(n)$ formed by
    a line segment obtained by projecting a line segment connecting a center of each side in each emission surface constituting the inclined surface group and a position, where light from the light source is incident on the light guide plate and is regarded as a virtual light source in the light guide plate, on the emission surface, and
    a perpendicular line of each side in each emission surface constituting the inclined surface group satisfies a condition of $|\theta p(n)| \leq 40°$ (n=1, 2, . . . ).

5. The display device of claim 1, wherein an angle $\theta t$ formed by an inclined surface of the facing end surface and the reflection surface in the light guide plate satisfies a condition of $20°<\theta t<60°$.

6. The display device of claim 1,
    wherein a width H_bp of a picture formed in an assembly of the prisms in a direction of the side end surface,
    a width H_b of the light guide plate in the direction of the side end surface, a width H_by of a region in which the inclined surface group is not formed in the light guide plate in the direction of the side end surface, and
    a width H_cp of the concealing plate in the direction of the side end surface in the light transmitter satisfy a condition of H_b>H_by>H_cp>H_bp.

7. The display device of claim 1, further comprising:
    a design sheet that is disposed on a side of the reflection surface of the light guide plate and partially transmits light; and
    a second light source, which is disposed on the side of the reflection surface of the light guide plate and farther than the design sheet, and causes light to be incident onto the concealing plate, through the design sheet, the reflection surface and the emission surface.

8. The display device of claim 1, wherein the light incident on the inclined surface group is emitted from the side end surface.

9. The display device of claim 8, wherein the light incident on the inclined surface group is suppressed from propagating through the light guide plate.

* * * * *